(12) United States Patent
Fernandez

(10) Patent No.: US 6,756,893 B1
(45) Date of Patent: Jun. 29, 2004

(54) LIGHT EMITTING DIODES SURROUNDING A VEHICLE LAMP

(76) Inventor: Robert Fernandez, 8620 NW. 190 Ter., Miami, FL (US) 33015

( * ) Notice: Subject to any disclaimer, the term of this patent is extended or adjusted under 35 U.S.C. 154(b) by 0 days.

(21) Appl. No.: 10/047,887

(22) Filed: Jan. 14, 2002

(51) Int. Cl.⁷ ......................... B60Q 11/00; H05B 39/10; H05B 41/46; F21V 21/00
(52) U.S. Cl. .......................... 340/458; 315/77; 315/88; 362/249
(58) Field of Search ................................ 340/458, 468, 340/472, 475, 479; 315/77, 82, 83, 86–93; 362/228, 487, 507, 555

(56) References Cited

U.S. PATENT DOCUMENTS

| | | | |
|---|---|---|---|
| 2,342,639 A | | 2/1944 | Bradley |
| 4,195,281 A | * | 3/1980 | Bell ........................... 340/458 |
| 5,216,328 A | * | 6/1993 | Lu ............................... 315/88 |
| 5,491,383 A | * | 2/1996 | Leiber et al. .................. 315/77 |
| 5,680,098 A | | 10/1997 | Bejster |
| 5,685,637 A | * | 11/1997 | Chapman et al. ............ 340/458 |
| 5,921,660 A | * | 7/1999 | Yu .............................. 362/249 |
| 5,955,945 A | | 9/1999 | Fuhrer |
| 6,281,631 B1 | | 8/2001 | Schaffer |
| 6,338,647 B1 | * | 1/2002 | Fernandez et al. .......... 439/490 |
| 6,417,624 B1 | * | 7/2002 | Ito et al. ........................ 315/88 |

FOREIGN PATENT DOCUMENTS

GB 2067368 A * 7/1981 ........... H05B/43/00

* cited by examiner

Primary Examiner—Jeffery Hofsass
Assistant Examiner—Anne V. Lai
(74) Attorney, Agent, or Firm—Alvin S. Blum

(57) ABSTRACT

A plurality of light emitting diodes are mounted on a base that encircles or surrounds a primary vehicle light source such as a headlight, a taillight, a turn signal light or the like. A control circuit senses when the primary light source fails to provide the requisite light, and applies power to the light emitting diodes so that the vehicle can continue safely without loss of the function served by the primary light source. Additional diodes may be provided on the base to serve an ornamental function.

18 Claims, 2 Drawing Sheets

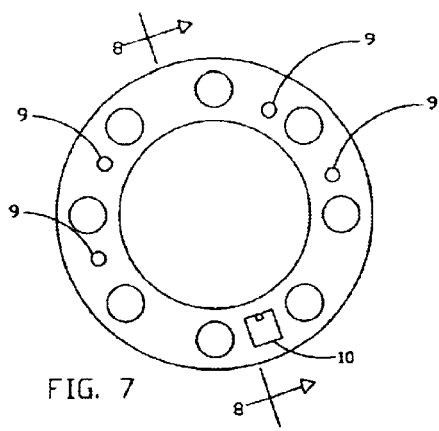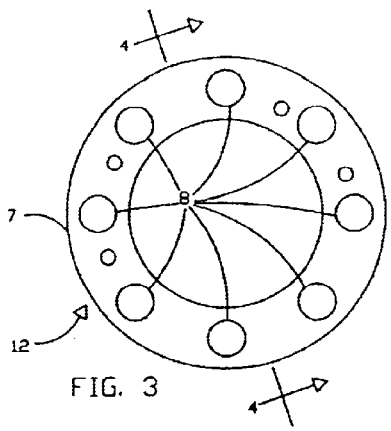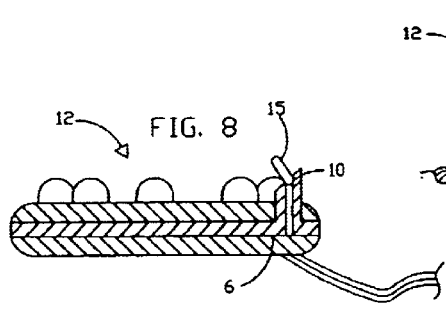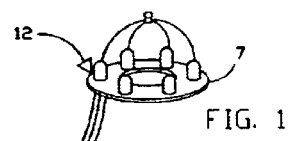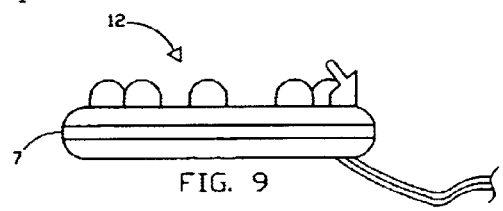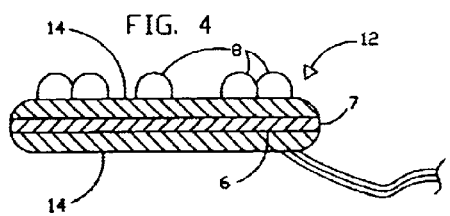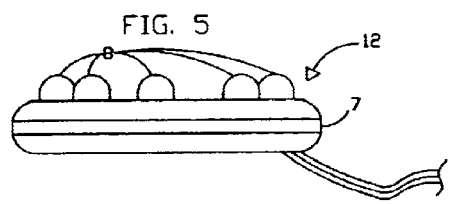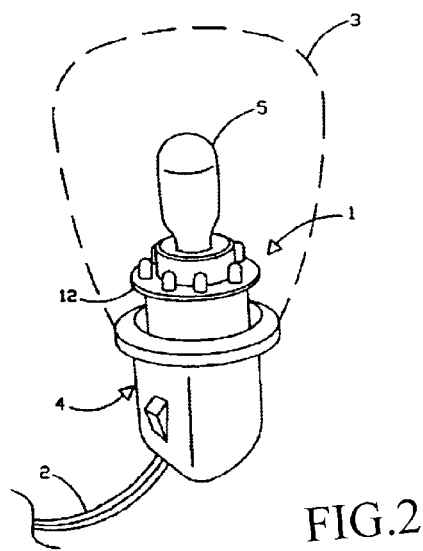

LIGHT EMITTING DIODES SURROUNDING A VEHICLE LAMP

This invention relates to external motor vehicle lights, and more particularly to a ring of light emitting diodes that surround an external vehicle lamp to provide supplemental light and/or to provide light when the external vehicle lamp fails.

BACKGROUND OF THE INVENTION

Headlight failures pose a serious danger on the road. Portions of the road will not be adequately visualized when a headlight fails. Other drivers may assume the single headlight indicates a motorcycle and not provide enough clearance. Many new vehicles have a dashboard indicator that warns the driver when a bulb has failed. When a taillight fails, following drivers pose a danger and the police have an easy target. U.S. Pat. No. 6,281,631 issued Aug. 28, 2001 to Schaffer et al., and U.S. Pat. No. 5,680,098 issued Oct. 21, 1997 to Bejster teach using an existing bulb serving a first function to assume the function of a second bulb that has failed. These can provide the driver with some protection until the bulb is replaced. They may deprive the vehicle of the first function. It would be useful to have a simple inexpensive system that could be easily retrofitted to provide a light source that would automatically emit light from the same housing as the failed bulb in the event of bulb failure.

SUMMARY OF THE INVENTION

It is accordingly an object of the invention to provide a plurality of light emitting diodes that surround the light bulb and that automatically emit light in the event of the failure of the bulb. The ring of diodes assembly may be a part of the bulb socket, or it can be retrofitted to an existing socket. By positioning the emitters within the bulb housing, the emitted light may reflect in the same way by the reflector in the housing, and may be easily installed. The light emitting diodes may be selected to emit a similar amount and color of light as the failed bulb did. The circuit providing power to the diodes may employ various means for sensing when the bulb has failed, such as those disclosed in the '098 and '631 patents, for example.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a perspective view of the invention.

FIG. 2 is a perspective view of the invention in place on a lamp bulb socket.

FIG. 3 is a top view of the assembly of FIG. 1.

FIG. 4 is a sectional view taken on line 4—4 of FIG. 3.

FIG. 5 is a side view of the device of FIG. 1.

FIG. 7 is a top view of another embodiment of the invention.

FIG. 8 is a sectional view taken on line 8—8 of FIG. 7.

FIG. 9 is a side view of the embodiment of FIG. 7.

DETAILED DESCRIPTION OF PREFERRED EMBODIMENTS

Figure 10:
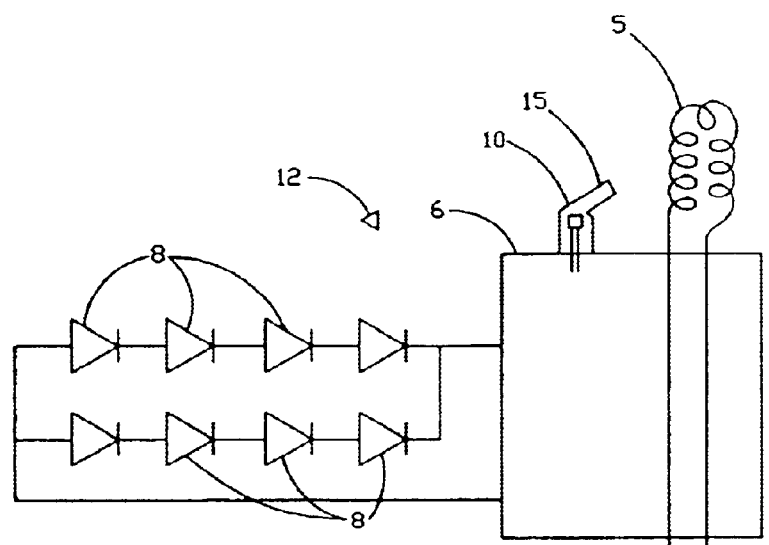
FIG. 10 is a diagrammatic representation of the control circuit of FIG. 7.
Figure 6:
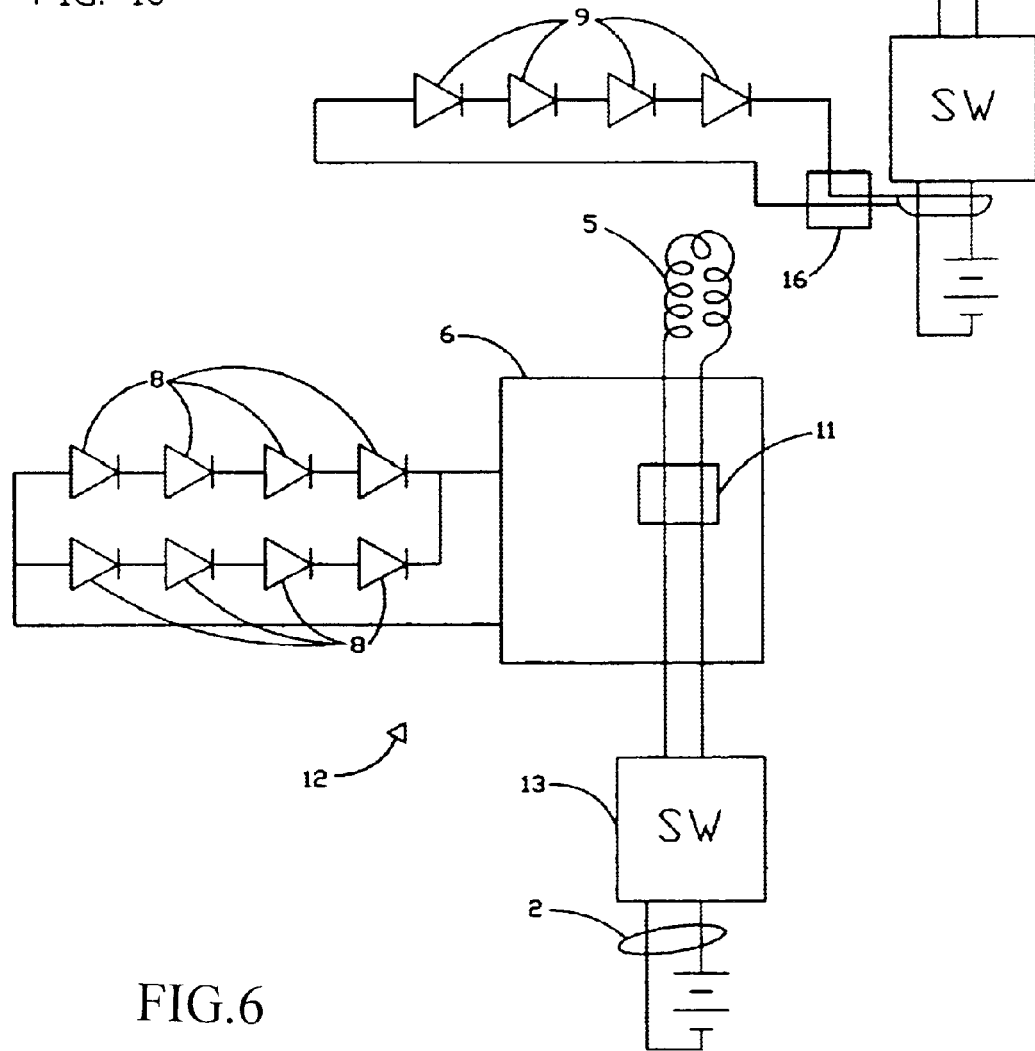
FIG. 6 is a diagrammatic representation of a control circuit of the invention.

Referring now to the drawing FIGS. 1–6, a conventional lamp housing 3 has a primary light source 5 such as an incandescent light bulb for a vehicle headlight, stoplight, turn signal, or back up light. The bulb 5 is mounted in a socket 4 that is coupled to the electric power terminals 2 through the usual operating switches 13 to turn on the light as required to emit the requisite light external to the vehicle. Mounted on the socket 4 is a plurality of LED's (light emitting diodes) 8 so positioned as to encircle or surround the source 5. They may be provided as part of a specially constructed socket, or they may be mounted on an annular base 7 that is adapted as a special circuit 12 to be retrofitted onto an existing socket, by drilling a hole for the wires through the socket.

A control means 6 that may be mounted on the base 7 and embedded in epoxy 14, includes a current sensing means 11 that senses the current flowing to the bulb 5 when the light is turned on. It is configured to apply electric power to the plurality of LED's 8 whenever the switch 13 is on and the current flowing to bulb 5 is below a preset level. This type of circuit is well known in the art such as low battery indicators and need not be further detailed here. When the bulb 5 burns out, current flow will drop, and the emitters 8 will be energized to provide the vehicle with light until the bulb can be replaced. This will enable the vehicle to be operated safely. The position of the emitters around the bulb enables the housing, lens, and reflector to effectively project the light in a fashion similar to that of the failed bulb. When the current to the bulb falls below a preset value because the electric power is reduced below the level required to emit the requisite light, the emitters 8 will also be energized to provide more light.

Referring now to FIGS. 8–10, another embodiment 12' of the invention is shown. The control means 6' includes a light sensor 10 below a collimating tube 15 to receive light from the bulb 5 and be unresponsive to light from other sources. The control means 6' is adapted to apply power to the plurality of diodes 8 when the light sensed by light sensor 10 is below a preset level. This reduction in light may be caused by failure of light source 5, or inadequate electric power such a battery or alternator failure. Additional light emitting diodes 9 may optionally be mounted on the base for decorative or ornamental purposes. These may be activated through switch 16. These lights 9 may be of different colors, and may be intermittent, as desired the switch 16 may cooperate with an alarm system.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A lighting assembly for a lamp housing for enclosing a primary light source that emits the requisite light external to a vehicle, the assembly coupled to electric power terminals of the vehicle power supply, the assembly comprising:

a) a lamp socket for receiving the primary light source within the housing operatively connected to the power terminals;

b) a plurality of light emitting diodes disposed on the light socket surrounding the primary light source; and c) control means for automatically energizing the plurality of light emitting diodes when the primary light source fails to emit the requisite light.

2. The assembly according to claim 1, in which the control means comprises a light sensing element that senses when the primary light source is not emitting the requisite light.

3. The assembly according to claim 1, in which the control means assembly comprises a current sensing element which senses when the primary light source is not drawing current necessary to deliver the requisite light.

4. The assembly according to claim 1 further comprising light emitting diodes mounted on the base for emitting light for decorative purposes.

5. The circuit according to claim 1, in which the primary light source is a headlight.

6. The circuit according to claim 1, in which the primary light source is a taillight.

7. The circuit according to claim 1, in which the primary light source is a brake light.

8. The circuit according to claim 1, in which the primary light source is a turn signal light.

9. The circuit according to claim 1, in which the primary light source is a back up light.

10. In a lighting assembly coupled to electric power terminals of a vehicle power supply having:

a primary light source for emitting the requisite light external to the vehicle;

a lamp housing for the primary light source; and a lamp socket for the primary light source within the housing operatively connected to the power terminals, a circuit comprising:

a) an annular base adapted for mounting on the light socket surrounding the primary light source;

b) a plurality of light emitting diodes mounted in a circular pattern on the base; and c) control means for automatically energizing the plurality of light emitting diodes when the primary light source fails to emit the requisite light.

11. The circuit according to claim 10, in which the control means comprises a light sensing element that senses when the primary light source is not emitting the requisite light.

12. The circuit according to claim 10, in which the control means comprises a current sensing element which senses when the primary light source is not drawing current necessary to emit the requisite light.

13. The circuit according to claim 10 further comprising light emitting diodes mounted on the base for emitting light for decorative purposes.

14. The circuit according to claim 10, in which the primary light source is a headlight.

15. The circuit according to claim 10, in which the primary light source is a taillight.

16. The circuit according to claim 10, in which the primary light source is a brake light.

17. The circuit according to claim 10, in which the primary light source is a turn signal light.

18. The circuit according to claim 10, in which the primary light source is a back up light.

\* \* \* \* \*